3,310,819
UPHOLSTERY CONSTRUCTION
Ben Morrison, 11124 Westwood Blvd.,
Culver City, Calif. 90230
Filed Oct. 18, 1965, Ser. No. 497,214
5 Claims. (Cl. 5—353)

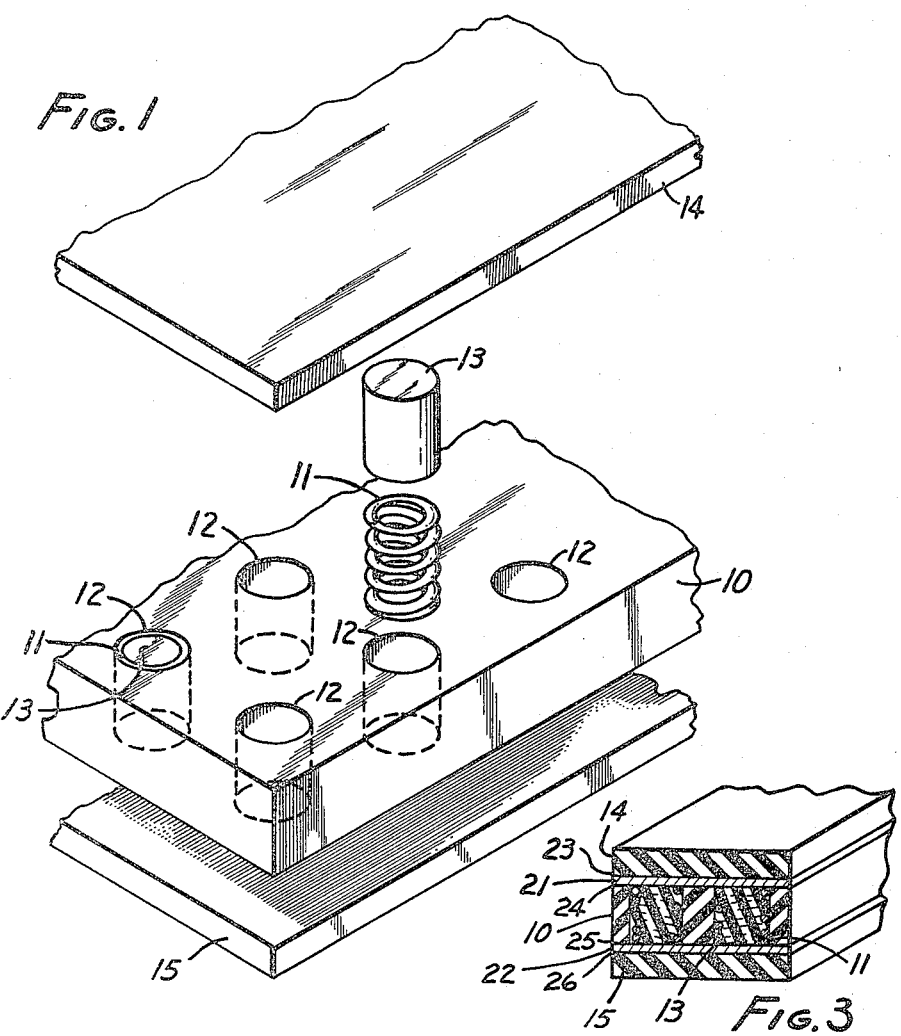
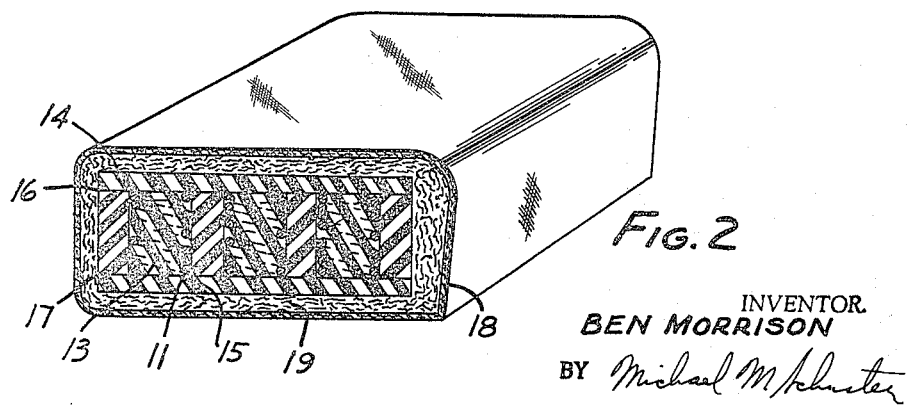

This invention relates to methods of upholstery construction.

An object of this invention is to utilize layers of elastomeric materials of various resiliencies in an efficient manner to achieve layered upholstery construction.

A further object of this invention is to utilize the effects of coil springs within a layered elastomeric foam upholstery core assembly construction to improve the core assembly strength and resiliency.

A further object of this invention is to use one layer of the elastomeric foam material itself as the self-pocketing material for steel coil springs. A further object of the invention is to re-use material removed from a layer of foam to create a pocket within the coil spring, as a reinforcing member without the use of additional material.

A further object of this invention is to provide reinforcing material to prevent coil springs from piercing the foam elastomeric layers.

The foregoing objects and other features of this invention will be better understood from the following detailed description of the associated accompanying drawings of which:

FIG. 1 is an exploded perspective view of an embodiment of the invention showing parts in relative position before assembly;

FIG. 2 is a sectioned perspective view of the embodiment of the invention in FIG. 1 assembled and contained in a cushion;

FIG. 3 is a sectioned perspective view of another embodiment of the invention.

The embodiment of the invention shown in FIG. 1 would be used, in general, as the central coil unit to be utilized in a unit construction as the core for further upholstery to construct cushions, mattresses, or upholstered furniture, or any other such application.

Elastomeric foam such as polyurethane foam is preferred for the construction of this invention but the invention is applicable to other cellular elastomeric materials such as sponge rubber, synthetic rubber and similar substances.

Polyurethane foams are available in many densities, the resiliency, in general, decreasing as the density increases. Conversely, the cost of the material increases as the density increases. Therefore, it is advantageous to use a low density polyurethane foam for as much of the structure as is possible. This is provided in the instant invention by adding to the resiliency of a central core sheet 10 of low density polyurethane foam by utilizing coil springs 11. Outer sheets 14 and 15 of the core unit are made of a higher density, lower resiliency polyurethane foam to help distribute load between the coil springs of the unit. The ratio between densities of the central core sheet 10 polyurethane foam and the outer sheets 14 and 15 may be in the order of 3 to 1 with higher or lower ratios dependent on intended usage and cost factors.

In building the central coil spring-foam unit the following construction is used. A core sheet 10 of polyurethane foam of thickness preferably less than the undeflected length of coil springs 11 has coil spring pockets 12 pierced therein in such a manner as to remove the material from the spring pockets 12 in a unitary plug 13. The plug 13 is then forced into the inside diameter of spring 11 in a coaxial relationship. It is to be understood that plug 13 may be made in any other convenient manner and its density and/or resiliency thus varied. Spring 11 containing plug 13 is then inserted into the spring pocket 12 that has been pierced. Outer sheets 14 and 15 are then glued or otherwise bonded to the core sheet 10, compressing coil springs 11 to establish a preload on the coil springs 11 which will urge core sheet 10 to original thickness after the core assembly is placed under a compressive load and the load is removed, thus preventing the permanent set that could otherwise result. This forms a unitary coil spring reinforced foam core for use in other upholstery applications. The bond lines 16 and 17 may be seen in FIG. 2.

FIG. 2 shows one such application as would be used in a cushion, a partial cross-section of such a cushion being shown. An outer layer of fabric or plastic upholstery material 18 is shown as an outer cover. A layer of fibrous material 19 is interposed between the outer covering of fabric 18 and the outer layers 14 and 15 of the central coil spring unit. This material 19 may also be a foam material if desired. The construction of the central coil foam core unit is the same as described for FIG. 1.

FIG. 3 illustrates another embodiment of the invention. Interposed between the center core sheet 10 as previously described in FIG. 1 and the outer sheets 14 and 15 are inter-layer sheets 21 and 22 of stiff sheet material. Outer sheets 14 and 15 are bonded to sheets 21 and 22 which are bonded to center core sheet 10 on bond areas 23, 24, 25 and 26. The inter-layer sheets may be made of a tough fabric such as buckram or canvas, or may be made of a sheet vinyl or other non-cellular plastic adapted with perforations to permit the passage of air. The inter-layer sheets 21 and 22 serve to receive and distribute the force exerted by coil springs 13 to prevent wear of outer sheets 14 and 15.

This invention may have other embodiments without departing from the spirit or characteristics thereof and the present embodiment is therefore to be considered as illustrative and not restrictive and it is intended to include all the changes which are within the scope and range of the claims.

I claim:

1. A coil spring core assembly for use in upholstered furniture which comprises: a center core sheet, said center core sheet in the form of an elastomeric foam sheet, a plurality of coil springs, a series of cylindrical pockets cut from said foam core, said pockets of substantially the same diameter as the outside diameter of said coil springs, a plurality of plugs, said plugs made of said foam center core sheet material cut from said cylindrical pockets, said plug adapted to be inserted in said coil spring for reinforcement; a first sheet and a second sheet of elastomeric foam material, said first sheet of foam material bonded to one side of said center core sheet to cover said coil pockets which contain said coil springs and said plugs, said second sheet of said foam adapted to be bonded to the other side of said center core sheet to cover the coil pockets containing said coil springs and plugs.

2. Apparatus as described in claim 1 which includes said center core sheet having a relatively lower density than said first and second sheets of elastomeric foam material and said undeflected length of said coil springs greater in length than the thickness of said center core sheet, said coil springs preload said center core sheet.

3. Apparatus as described in claim 2 which includes said first and second foam sheets of smaller thickness relative to the thickness of said foam core sheet.

4. Apparatus as described in claim 1 which includes said center core sheet and said first and second sheets made of polyurethane cellular material.

5. Apparatus as described in claim 1 which includes a first and a second sheet of non-cellular material, said sheets bonded between said first sheet of elastomeric foam material and said center core sheet and said second sheet of elastomeric foam material and said center core sheet.

References Cited by the Examiner

UNITED STATES PATENTS

| | | | |
|---|---|---|---|
| 1,192,510 | 7/1916 | Fischmann | 5—253 X |
| 2,446,775 | 8/1948 | Marsack | 5—353 |
| 2,469,596 | 5/1949 | Groom | 5—254 |
| 2,536,310 | 1/1951 | Reed | 5—353 |
| 2,785,440 | 3/1957 | Toulmin | 5—351 X |
| 2,882,959 | 4/1959 | Burkart | 5—353 X |
| 3,118,153 | 1/1964 | Hood | 5—345 |
| 3,145,020 | 8/1964 | Calla | 267—1 |
| 3,178,735 | 4/1965 | Thompson et al. | 5—353 |
| 3,204,016 | 8/1965 | Sanger et al. | 5—351 X |

FOREIGN PATENTS

| | | |
|---|---|---|
| 1,110,462 | 2/1956 | France. |
| 1,040,211 | 10/1958 | Germany. |

FRANK B. SHERRY, *Primary Examiner.*
CASMIR A. NUNBERG, *Examiner.*